United States Patent
Polidori et al.

(10) Patent No.: US 11,101,581 B2
(45) Date of Patent: Aug. 24, 2021

(54) COVER FOR HIGH VOLTAGE ELECTRICAL CONNECTOR

(71) Applicant: Burndy, LLC, Manchester, NH (US)

(72) Inventors: Nicholas Polidori, Medford, NJ (US); Jeremy Jushchyshyn, North Wales, PA (US)

(73) Assignee: BURNDY LLC, Manchester, NH (US)

( * ) Notice: Subject to any disclaimer, the term of this patent is extended or adjusted under 35 U.S.C. 154(b) by 9 days.

(21) Appl. No.: 16/596,135

(22) Filed: Oct. 8, 2019

(65) Prior Publication Data

US 2021/0104826 A1    Apr. 8, 2021

(51) Int. Cl.
*H01R 4/70*      (2006.01)
*H01R 43/00*     (2006.01)
*H02G 3/04*      (2006.01)

(52) U.S. Cl.
CPC ............... *H01R 4/70* (2013.01); *H01R 43/00* (2013.01); *H02G 3/0418* (2013.01)

(58) Field of Classification Search
CPC ........................................................ H01R 4/70
USPC ........................................................ 174/72 C
See application file for complete search history.

(56) References Cited

U.S. PATENT DOCUMENTS

| | | | |
|---|---|---|---|
| 2,206,653 A | 7/1940 | Yonkers | |
| 3,275,974 A * | 9/1966 | Mixon, Jr. | ............... H01R 4/50 439/783 |
| 3,491,331 A * | 1/1970 | Glader | ................. H01R 4/5091 439/783 |
| 3,697,932 A | 10/1972 | Keto et al. | |
| 3,711,138 A | 1/1973 | Davis | |
| 4,403,895 A | 9/1983 | Caldwell et al. | |
| 4,683,785 A * | 8/1987 | Perraudin | ............... B23F 13/02 82/1.11 |
| 10,465,732 B2 * | 11/2019 | Polidori | ................. F16B 37/14 |
| 2004/0068319 A1 | 4/2004 | Cordaro | |
| 2007/0142837 A1 | 6/2007 | Dreyfuss | |
| 2008/0112775 A1 * | 5/2008 | Hsu | ....................... F16B 35/041 411/394 |
| 2008/0177307 A1 * | 7/2008 | Moskowitz | ........ A61B 17/7064 606/246 |
| 2013/0023992 A1 * | 1/2013 | Moskowitz | ........ A61B 17/8047 623/17.16 |
| 2014/0345938 A1 * | 11/2014 | Royer | .................. H01R 43/027 174/88 R |

(Continued)

OTHER PUBLICATIONS

International Search Report and Written Opinion in corresponding International Application PCT/US2020/53097 dated Feb. 12, 2021 (11 pages).

*Primary Examiner* — Stanley Tso
(74) *Attorney, Agent, or Firm* — Wissing Miller LLP

(57) ABSTRACT

A locking mechanism particularly adapted to lock a cover of an electrical connector which connects an electrical transmission conductor to a distribution conductor. The locking mechanism includes a tip portion, a spiral portion, a holding portion, and an engagement portion, where the tip portion has a smaller cross-sectional area than the spiral portion and where the engagement portion is a widest portion of the locking mechanism. The present invention is also directed to a method of using the locking mechanism to lock the cover, as well as to a cover system which includes the locking mechanism and the cover engaged such that the cover is locked.

6 Claims, 5 Drawing Sheets

(56) References Cited

U.S. PATENT DOCUMENTS

2016/0141801 A1\* 5/2016 Siebens ................. H01R 31/02
                                                          439/92
2017/0033541 A1\* 2/2017 McCallum ............... H02G 3/02
2018/0031795 A1   2/2018 Ghossein et al.

\* cited by examiner

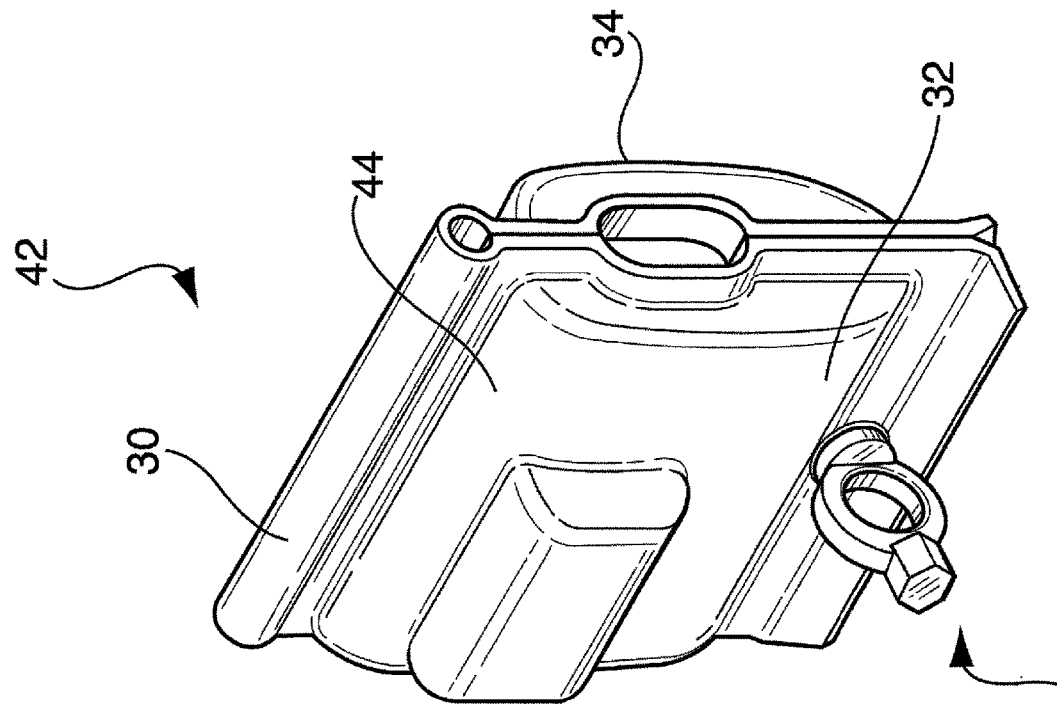
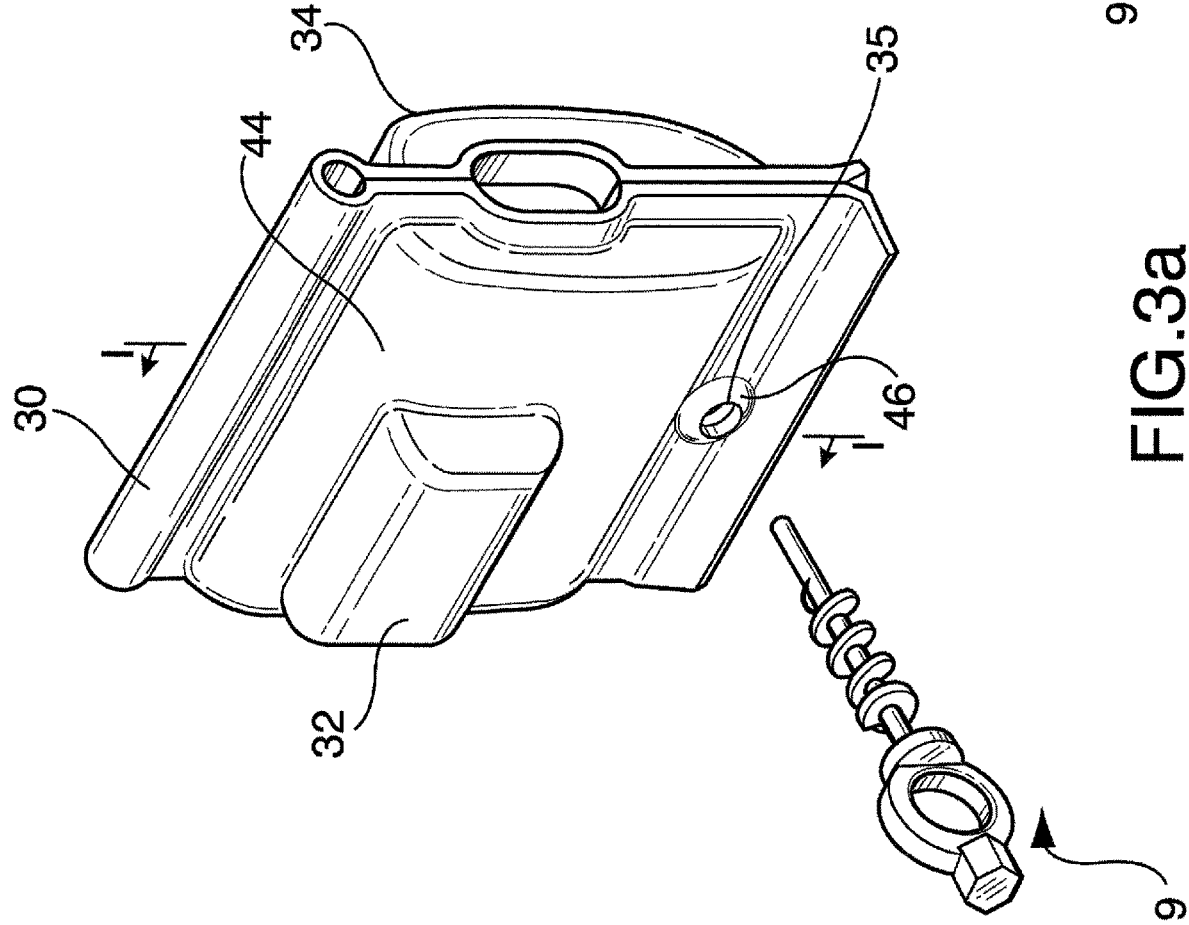

COVER FOR HIGH VOLTAGE ELECTRICAL CONNECTOR

BACKGROUND OF THE INVENTION

The present invention is directed toward a cover for a high voltage electrical connector and, more particularly, toward a locking mechanism for such a cover, a method of using the locking mechanism, and a system including the locking mechanism.

Electrical distribution systems, especially high voltage electrical distribution systems, often require having an electrical transmission conductor and a distribution conductor. The distribution conductor may draw away some of the current from the electrical transmission conductor or it may feed current into the electrical transmission conductor, depending what is needed. Such operation requires an electrical connector to connect the two different conducting wires. Furthermore, because of the high voltages and associated safety issues, such electrical connectors must be covered with insulating covers (herein otherwise also referred to as "covers"). However, for safety purposes, it is desirable to have a way to lock the cover so that it stays on even in inclement weather as well as to be tamper-proof. Additionally, there is a need for a locking mechanism which is easy to use and does not require an operator to be too close to the cover to operate the locking mechanism due to the high voltage, and the present invention addresses all of these requirements, as more fully explained below.

SUMMARY OF THE INVENTION

The present invention is designed to address the needs for the locking mechanism as explained above. It is an object of the present invention to provide a locking mechanism which can be easily utilized to close a cover for a high voltage electrical connector.

It is another object of the present invention to provide such a locking mechanism that can be operated without an operator getting too close to the high voltage electrical connector.

It is yet another object of the present invention to provide such a locking mechanism that is robust and will maintain the cover for the high voltage electrical connector from opening even in inclement weather.

It is a further object of the present invention to provide such a locking mechanism that is tamper-proof.

In accordance with the illustrative embodiments demonstrating features and advantages of the present invention, there is provided a locking mechanism particularly adapted to lock a cover of a high voltage electrical connector for connecting an electrical transmission conductor to a distribution conductor. Such locking mechanism includes: a tip portion, a spiral portion, a holding portion, and an engagement portion, and the tip portion has a smaller cross-sectional area than the spiral portion and the engagement portion is a widest portion of the locking mechanism.

Furthermore, the present invention is also directed to a method of locking the cover of the high voltage electrical connector for connecting the electrical transmission conductor to the distribution conductor. Such method includes: inserting the tip portion of the locking mechanism into an opening of a first side of the cover, turning the locking mechanism such that the spiral portion enters the opening of the first side, inserting the tip portion of the locking mechanism into an opening of a second side of the cover, and turning the locking mechanism such that the spiral portion enters the opening of the second side.

In another aspect, the present invention is also directed to a cover system (otherwise also referred to as a "system") for the high voltage electrical connector. The electrical connector is operably connected to the electrical transmission conductor and the distribution conductor. The system for the electrical connector includes the cover for the electrical connector and the locking mechanism configured to lock the cover. The cover includes the first side and the second side, and they are positioned to cover and protect the electrical connector, and the first side and the second side are operably connected at one end.

Other objects, features, and advantages of the invention will be readily apparent from the following detailed description of the preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1e is a rear view the locking mechanism shown at FIG. 1a;

FIG. 1f is a front view of the locking mechanism shown at FIG. 1a;

FIG. 3a is a side perspective view of the locking mechanism according to the present invention and the cover which it locks;

FIG. 3b is a side perspective view of the system according to the present invention;

DETAILED DESCRIPTION OF THE PREFERRED EMBODIMENT

Figure 1A:
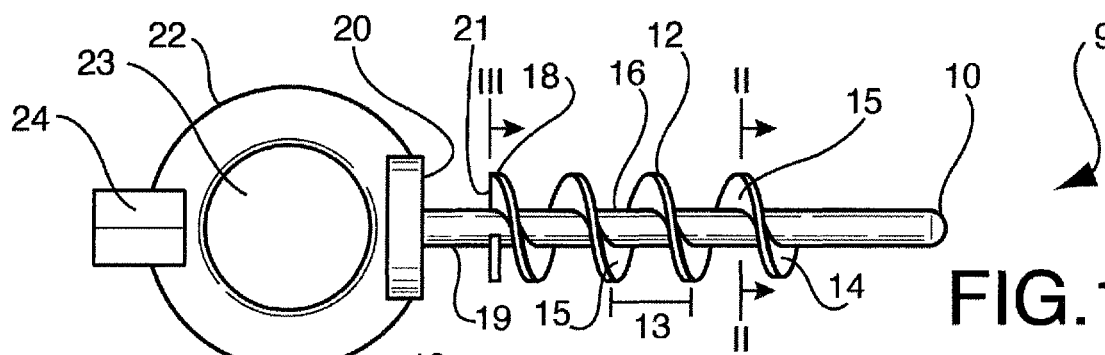
FIG. 1a is a side view of a locking mechanism in accordance with the present invention.
Figure 1B:
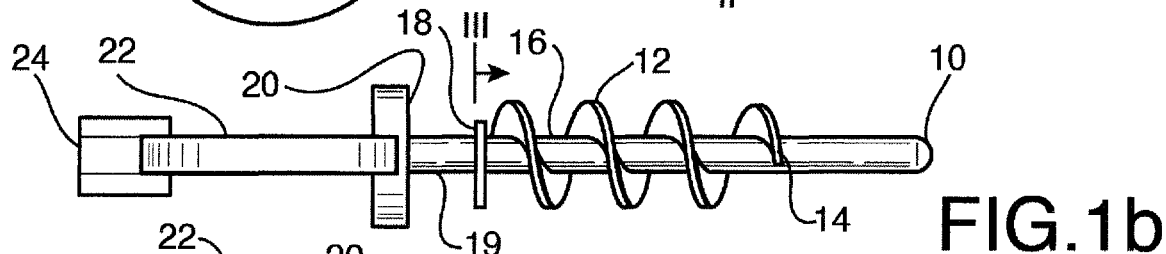
FIG. 1b is a side view of the locking mechanism shown at FIG. 1a which has been rotated 90° counter-clockwise relative to FIG. 1a where the axis of rotation extends left to right across the page.
Figure 1C:
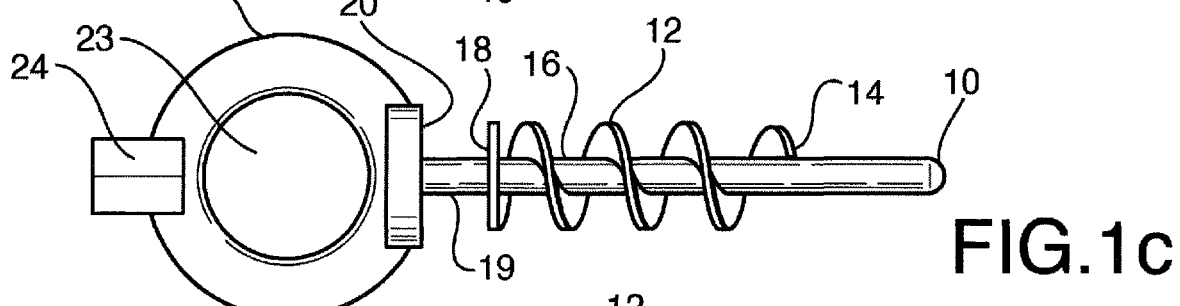
FIG. 1c is a side view of the locking mechanism shown at FIG. 1a rotated a further 90° relative to FIG. 1b.
Figure 1D:
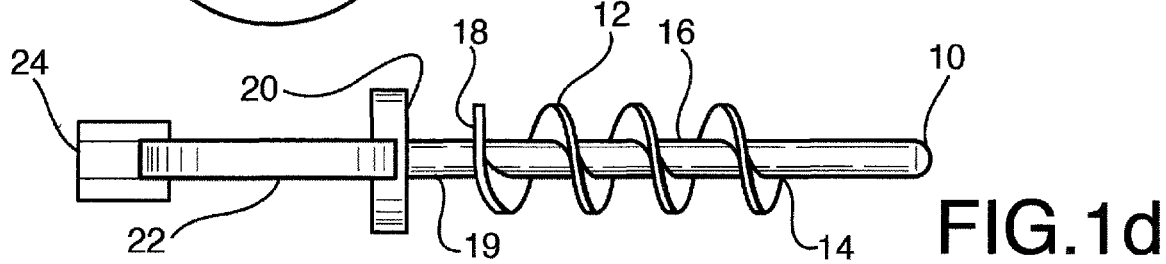
FIG. 1d is a side view of the locking mechanism shown at FIG. 1a rotated a further 90° relative to FIG. 1c.
Figure 1E:
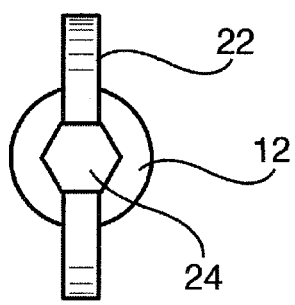
Figure 1F:
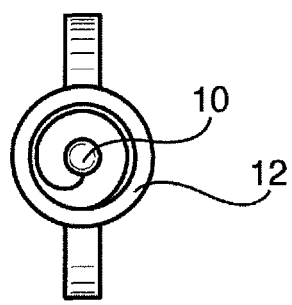

The present invention is directed to a locking mechanism. Such locking mechanism is used to lock a cover on an electrical connector for high voltage applications. In the present application, an electrical connector for high voltage applications (otherwise referred to as a high voltage electrical connector) is deemed to be an electrical connector capable of operating under normal conditions under at least a voltage of 33 kilovolts, preferably at least 66 kilovolts, and more preferably at least 110 kilovolts, and an ampacity of at least 500 A, preferably at least 1000 A, and more preferably at least 1500 A. In other words, the high voltage electrical connector can operably connect two conductors, such as an electrical transmission conductor and a distribution conductor, which have the voltage differences identified above, and which results in the current transfer identified above. The present invention is also directed to a method of using the locking mechanism to lock the cover. Additionally, the present invention is directed to a system which includes the cover and the locking mechanism.

Referring now to the drawings in detail wherein like reference numerals have been used throughout the various figures to designate like elements, there is shown in FIGS. 1-4 a locking mechanism and system constructed in accordance with the principles of the present invention.

Figure 2:
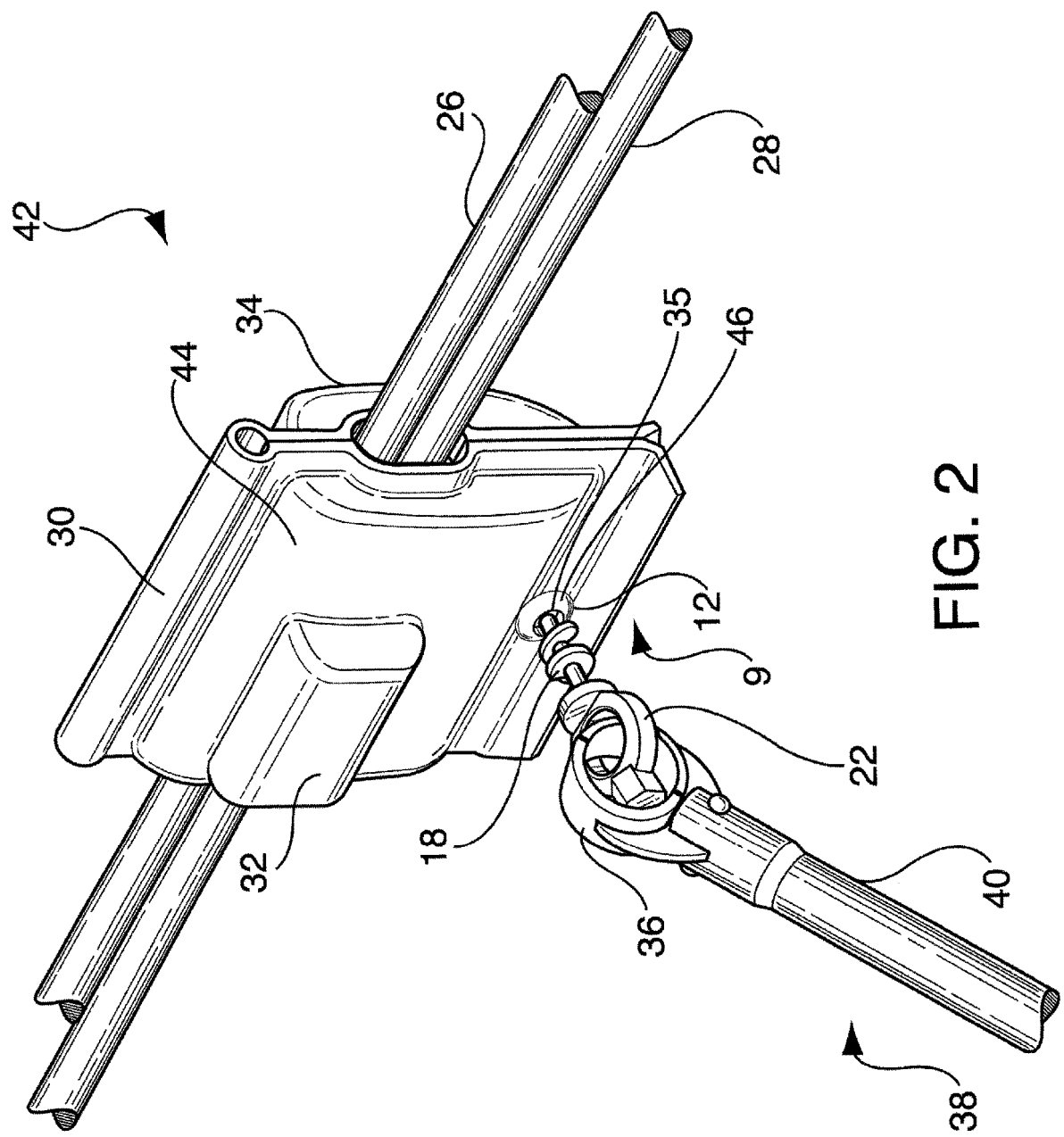
FIG. 2 is a side perspective view of a system according to the present invention.

In an aspect of the invention, FIGS. 1 and 2 show a locking mechanism 9 particularly adapted to lock a cover 44 for a high voltage electrical connector 29 (See FIG. 4) connecting an electrical transmission conductor 26 to a distribution conductor 28. Such electrical connectors are known in the art and no further explanation of such electrical connectors is necessary. U.S. Pat. No. 4,415,222 shows an example of an electrical connector and the disclosure of such patent is incorporated by reference herein in its entirety.

The locking mechanism 9 includes a tip portion 10, a spiral portion 12, a holding portion 19, and an engagement portion 22. The tip portion 10 has a smaller cross-sectional area (perpendicular to a longitudinal direction of the tip portion) than the spiral portion 12. The engagement portion 22 is a widest portion of the locking mechanism 9. The locking mechanism 9 also includes an axial portion 16. The tip portion 10 is part of the axial portion 16, and the axial portion 16 extends from the tip portion 10 through the holding portion 19. The spiral portion 12 is formed from a spiral-shaped flange which makes at least two complete turns around an outer surface of the axial portion 16 while extending at least partially between the tip portion 10 and the holding portion 19.

The spiral portion 12 has a first end 14 and a second end 18, and the first end 14 is configured to engage the cover 44 and to guide the movement of the cover 44 longitudinally along a first longitudinal direction of the axial portion 16 from the tip portion 10 to the holding portion 19, and the second end 18 is configured to engage the cover 44 and to hold the cover 44 from moving in a second longitudinal direction of the axial portion 16 which is opposite to the first longitudinal direction. Except for the second end 18, the spiral portion 12 continuously extends along the first longitudinal direction and around the axial portion 16 such that any plane perpendicular to the first longitudinal direction which intersects the spiral portion 12 except for the second end 18 will intersect the spiral portion 12 along less than a 30 degree extension along the outer surface of the axial portion 16. Also, a plane perpendicular to the first longitudinal direction which intersects the second end 18 of the spiral portion 12 will intersect the spiral portion 12 along more than a 30 degree extension along the outer surface of the axial portion 16.

Figure 5A:
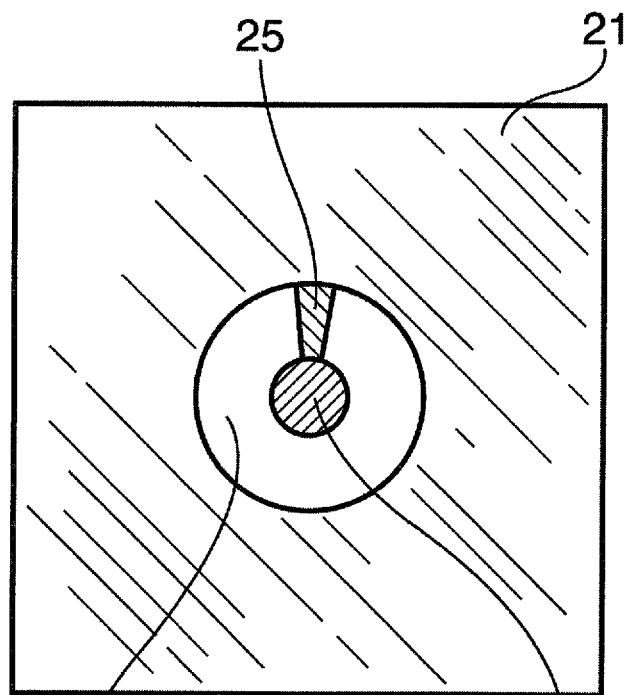
FIG. 5a is a cross sectional view taken through lines II-II of FIG. 1a and also showing a plane extending perpendicular the locking mechanism.
Figure 5B:
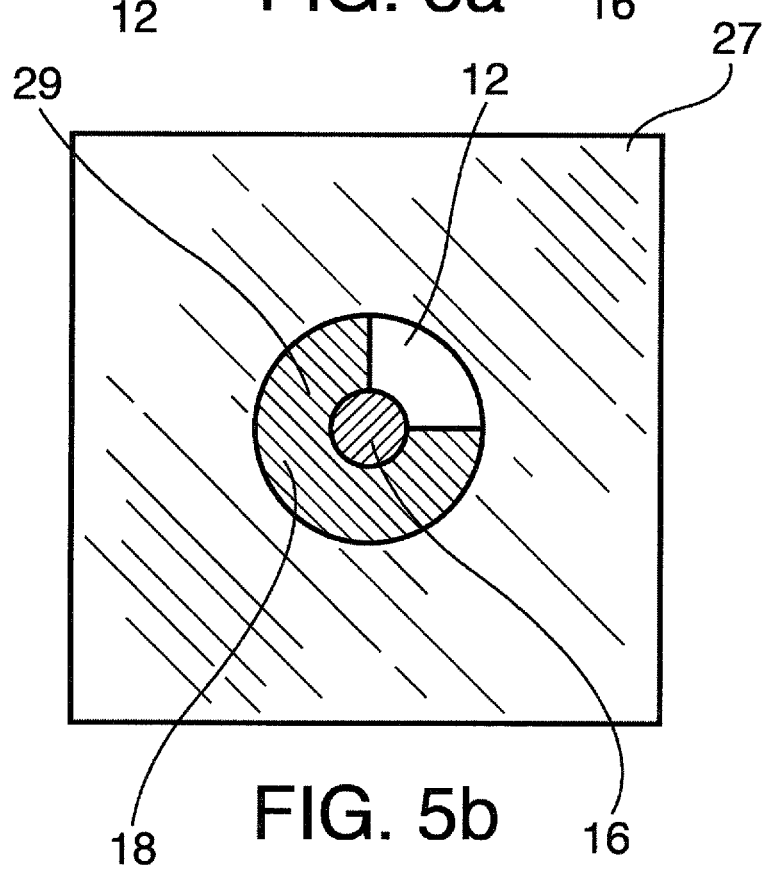
FIG. 5b is a cross sectional view taken through lines III-III of FIG. 1a and also showing a plane extending perpendicular the locking mechanism.

FIG. 5a shows a plane 21 perpendicular to the first longitudinal direction which intersects the spiral portion 12 except for the second end 18 and how it intersects the spiral portion 12 along less than a 30° extension along the outer surface of the axial portion 16. The reference numeral 25 is used to denote the intersection between the plane 21 and the spiral portion 12 along the outer surface of the axial portion 16. FIG. 5b shows a plane 27 perpendicular to the first longitudinal direction which intersects the second end 18 and how it intersects the second end 18 along more than a 30 degree extension along the outer surface of the axial portion 16. The reference numeral 29 is used to denote the intersection between the plane 27 and the second end 18 along the outer surface of the axial portion 16. At FIG. 5b, the second end 18 and the intersection 29 are coextensive.

In an embodiment, a substantial portion of the second end 18 extends in a direction substantially perpendicular to the first longitudinal direction. In other words, a substantial portion of the very edge (i.e., a terminal end portion 21) of the second end 18 extends in a direction substantially perpendicular to the first longitudinal direction and is essentially "flat". This is important since by extending perpendicular to the first longitudinal direction rather than extending at least partially along the longitudinal direction, the terminal end portion 21 (and, accordingly, the spiral portion 12) will not re-engage the cover 44 (or any of its sides 32, 34) once the cover 44 is located at the engagement portion 19, such that the cover 44 will reliably stay in the holding portion 19. In order to remove the cover 44 from the holding portion 19 requires breaking the locking mechanism 9 or the cover 44, or deforming the locking mechanism 9 or the cover 44 in a very specific way, which makes the locking mechanism 9 tamper-proof and resistant to inclement weather since there is no simple way to remove the cover 44 once it is locked in place by being in the holding portion 19.

The locking mechanism 9 has to be turned in order to connect with the cover 44. The engagement portion 22 defines an opening 23 through which the engagement portion 22 may be engaged to rotate the locking mechanism 9. The opening 23 may be circular or oval shaped or may have any other shape such as a quadrilateral shape. Also, the engagement portion 22 may be a widest portion of the locking mechanism 9 in a direction perpendicular to a line defined by the first longitudinal direction. The engagement portion 22 may be connected to a supporting end 20 and supporting end 20 helps hold the cover 44 in the holding portion 19. The supporting end 20 is connected to the axial portion 16. The engagement portion 22 may be integrally connected to an end part 24 which helps with stability, strength, and also can be used to carry or arrange the locking mechanism 9 in a rack since the end part 24 is wider than the engagement portion 22 in at least one dimension so the end part 24 can be used to support the locking mechanism 9 in such a rack, for example.

In another aspect, the present invention is directed to a method of locking the cover 44 of the electrical connector 29 with the locking mechanism 9 of the present invention. As stated above, the locking mechanism 9 may include the tip portion 10, the spiral portion 12, the holding portion 19, and the engagement portion 22, where the tip portion 10 has a smaller cross-sectional area than the spiral portion 12 and where the engagement portion 22 is a widest portion of the locking mechanism 9.

Figure 4:
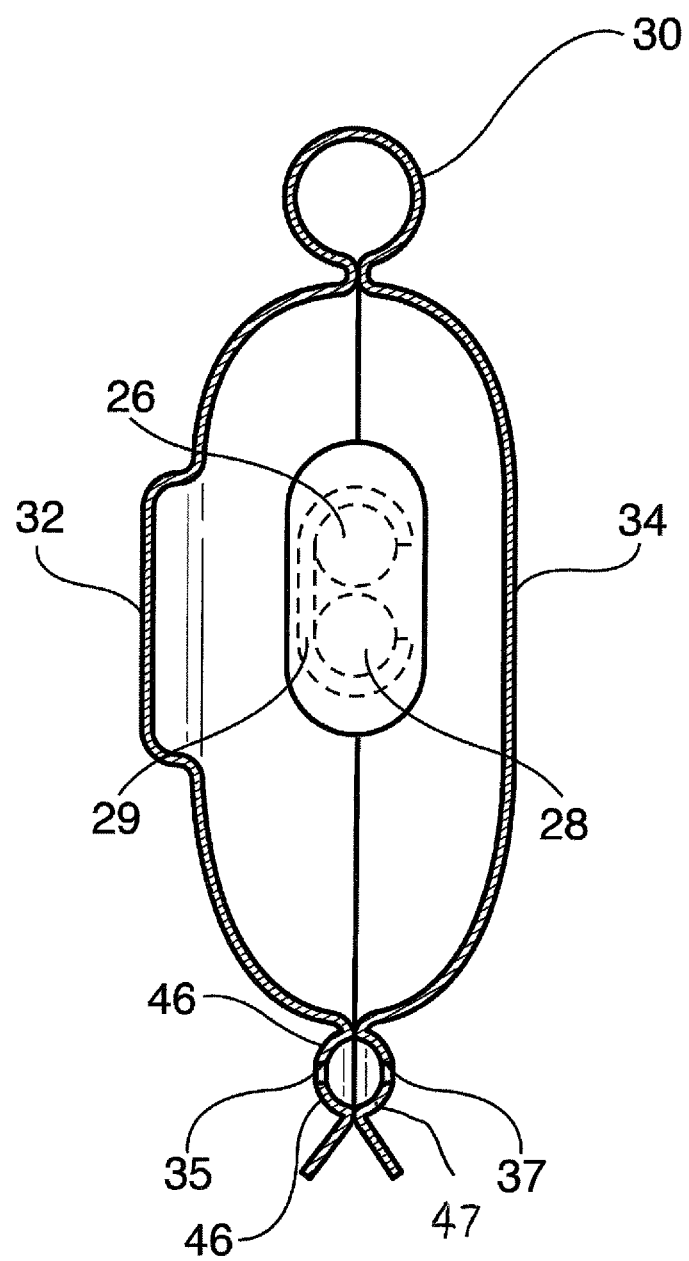
FIG. 4 is a cross sectional view taken through lines I-I of FIG. 3a and also showing the conductors and the electrical connector.

As shown at FIGS. 2, 3a and 3b, the method includes inserting the tip portion 10 of the locking mechanism 9 into an opening 35 of a first side 32 of the cover 44. Subsequently, the locking mechanism 9 is rotated such that the spiral portion enters the opening 35 of the first side 32. In FIG. 3a, the turning would be clockwise due to the way the spiral 12 is designed. Once the tip portion 10 has been inserted into the first side 32, if it continues moving in a same direction, it will reach the second side 34 of the cover 44. FIG. 4 shows opening 35 extending through the first side 32 of the cover 44 and opening 37 extending through the second side 34 of the cover 44 such that the tip portion 10 and the spiral 12 can enter the first side 32 and then the second side 34 via openings 35 and 37, respectively. Thus, the method includes inserting the tip portion 10 and the spiral portion 12 of the locking mechanism 9 into opening 35 and then into opening 37 of the cover 44. The method also includes turning the locking mechanism 9 such that the spiral portion 12 enters the openings 35, 37 of the first and second sides 32, 34 and to move the first and second sides 32, 34 along the spiral portion 12. In other words, as the spiral portion 12 engages the cover 44, the holding portion 19 may move towards the cover 44 and/or the cover 44 may move towards the holding portion 19.

After the tip portion 10 enters the opening 35 of the first side 32, the locking mechanism 9 can be turned such that the first side 32 moves along the spiral portion 12 until the first side 32 reaches the holding portion 19. FIG. 3b shows the first side 32 positioned inside the holding portion 19. Once the tip portion 32 enters the opening 37 of the second side 34, further turning of the locking mechanism 9 can be carried out such that the second side 34 moves along the spiral portion 12 until the second side 34 reaches the holding portion 19. FIG. 3b shows both the first side 32 and the second side 34 in the holding portion 19.

FIG. 2 shows one way to turn the locking mechanism 9. FIG. 2 shows a hot stick 38 operably engaging the engagement portion 22. The hot stick 38 may include a shaft 40, and engagement jaws 36. An operator which is distanced from the cover 44 can use the hot stick 38 to engage the engagement portion 22 by opening the engagement jaws 36 and closing them around the engagement portion 22. Then, the operator can turn the engagement jaws 36 such that this turns the engagement portion 22, which in turn causes the locking mechanism 9 to rotate. This rotation is what allows the locking mechanism 9 to lock the cover 44 in a closed position. Hot sticks 38 are known in the art and additional description is not necessary.

In an embodiment, as shown at FIGS. 2, 3a, and 4, the first side 32 includes a protrusion 46 which extends at least substantially around the opening 35 of the first side 32. The second side 34 may include a similar protrusion 47 surrounding the opening 37. The method of the present invention includes turning the locking mechanism 9 such that the second side 34 (in addition to the first side 32) moves along the spiral portion 12 until the second side 34 reaches the holding portion 19 such that the first side 32, the second side 34, and the protrusions 46 and 47 are all in the holding portion 19 and are subject to pressure in the holding portion 19. The pressure is exerted by the second end 18 and the supporting end 20 by deforming the protrusions 46 and 47 within the holding portion 19.

In an embodiment, the cover 44 substantially surrounds the electrical connector 29 (see FIG. 4) and the electrical connector 29 is operably connected to the electrical transmission conductor 26 and the distribution conductor 28. Although FIG. 3a does not show the electrical connector 29, the electrical transmission conductor 26, or the distribution conductor 28, these objects are shown at FIG. 4 in dotted lines to show where they would go if they were included at FIG. 3a.

Although FIGS. 3a and 4 show first side 32 and second side 34 adjacent to one another even if the locking mechanism 9 is not engaged to the first and second sides 32, 34, the first side 32 and the second side 34 may be spaced apart from one another and only connected via a cover end 30 prior to engagement with the locking mechanism 9. In such a case, the tip portion 10 can still enter the first side 32 and then the spiral 12 can enter the first side 32 and then the tip portion 10 can enter the second side 34 and then the spiral portion 12 can enter the second side 32. As stated above, as the locking mechanism 9 is rotated, the first and second sides 32, 34 can move along the spiral 12 in order to be accommodated in the holding portion 19, or the locking mechanism 9 can move such that the first and second sides 32, 34 end up in the holding portion 19. If the cover 44 is closed to begin with, it is possible for the tip portion 10 to enter into the first and second sides 32, 34 prior to the spiral portion 12 entering the cover 44, depending on the length of the tip portion 10 and the thickness of the first and second sides 32, 34, and the protrusions 46 and 47.

In yet another aspect, as shown at FIG. 2, the present invention is directed to a cover system 42 for the electrical connector 29 (shown at FIG. 4). The electrical connector 29 is operably connected to the electrical transmission conductor 26 and the distribution conductor 28 while in use. The system 42 includes the cover 44 for the electrical connector 29 and the locking mechanism 9 configured to lock the cover 44 around the electrical connector 29. For example, the system includes the cover 44 and the locking mechanism 9 locking the cover 44 as shown at FIG. 3b. The cover 44 includes the first side 32 and the second side 34, which are positioned to cover and protect the electrical connector 29. Also, the first side 32 and the second side 34 may be operably connected at the cover end 30. As stated above, the locking mechanism 9 includes the tip portion 10, the spiral portion 12, the holding portion 19, and the engagement portion 22. The tip portion 10 preferably has a smaller cross-sectional area than the spiral portion 12 and the engagement portion 22 is a widest portion of the locking mechanism 9.

The cover system 42 is designed such that the locking mechanism 9 is configured to operably engage the first side 32 and the second side 34 of the cover 44 through first and second openings 35, 37, respectively. In its locked position, the first and second openings 32, 34, are positioned on the holding portion 19. This can be seen at FIG. 3b with the conductors 26, 28 omitted for simplicity. The system 42 includes, on the first side 32 of the cover 44, the protrusions 46 and 47 which extend substantially around the first openings 35 and 37. When the system 42 is operated, the first side 32 (including the protrusion 46), and the second side 34, are under pressure while located on the engagement portion 19 of the locking mechanism 9. The pressure is generated by the protrusions 46 and 47 being squeezed between the supporting end 20 of engagement portion 22 and the second end 18 of the spiral portion 12 (see FIGS. 1a-1d).

The engagement portion 19 is designed such that it is approximately the same length (along the first axial direction) as the thickness (also in the first axial direction) of the combination of the first side 32, second side 34, and protrusion 46 to ensure that the cover 44 is held tight by the locking mechanism 9. It is possible for the engagement portion 19 to be a bit smaller (up to fifteen percent) as the combination of the thickness of the first side 32, the second side 34, and protrusion 46, when not under pressure, such that under pressure the first and second sides 32, 34 and the protrusion 46 are deformed at the engagement portion 19 in order to have approximately the same thickness as the length of the engagement portion 19. The cover 44, including the protrusions 46 and 47, are preferably made of a polymeric material (such as a type of plastic) due to the general lack of conductivity of polymeric materials.

The distance 13 between two adjacent groove walls 15 along the axial portion 16 (see FIG. 1a) is preferably at least twice as large as the thickness (in the first axial direction) of the first side 32 and the protrusion 46 combined in order to allow the first side 32 and the protrusion 46 to be able to be moved along the spiral 12. Preferably, distance 13 is between 200% and 225% of the thickness of the combined first side 32 and protrusion 46. The distance 13 may be greater if it is envisioned that the second side 34 will be moved along the spiral portion 12 while adjacent to the first side 32.

The present invention may be embodied in other specific forms without departing from the spirit or essential attributes thereof and accordingly, reference should be made to the appended claims rather than to the foregoing specification as indicating the scope of the invention.

We claim:

1. A locking mechanism adapted to lock a first cover half to a second cover half of a cover used to cover a high voltage electrical connector connecting an electrical transmission conductor to a distribution conductor, the first cover half having a first aperture and a first protrusion, and the second cover half having a second aperture and a second protrusion, the locking mechanism comprising:
    an axial portion having outer surface and a tip portion at a first end of the axial portion, the axial portion having a uniform outer diameter configured to pass through the first and second apertures, the tip portion having a first end and a second end spaced from the first end of the tip portion;
    a spiral-shaped flange attached to the outer surface of the axial portion and having a larger cross-sectional area than the axial portion, the spiral-shaped flange having a first flange end and a second flange end spaced from the first flange end, wherein the first flange end begins at the second end of the tip portion, wherein at least a portion of the second flange end extends from the axial portion in a direction perpendicular to a longitudinal axis of the axial portion forming a terminal end, and wherein the spiral-shaped flange makes at least two complete turns around the outer surface of the axial portion;
    an end support member having a first side and a second side, wherein the first side of the end support member is attached to a second end of the axial portion, and wherein at least the first side of the end support member has a cross-sectional area that is at least the same as the cross-sectional area of the spiral-shaped flange;
    an engagement portion attached to the second side of the end support member; and
    a holding portion extending along the axial portion between the terminal end of the spiral-shaped flange and the first side of the end support member;
    wherein when the first flange end is inserted into the first aperture in the first cover half and the engagement portion is rotated, the spiral-shaped flange guides movement of the first cover half along the spiral-shaped flange and the axial portion toward the holding portion;
    wherein when the first flange end is inserted into the second aperture in the second cover half and the engagement portion is rotated, the spiral-shaped flange guides movement of the second cover half along the spiral-shaped flange and the axial portion toward the holding portion; and
    wherein when the first aperture of the first cover half and the second aperture of the second cover half are within the holding portion, the first protrusion of the first cover half contacts the first side of the end support member and the second protrusion of the second cover half contacts the terminal end of the spiral-shaped flange such that the first and second protrusions deform holding the cover halves from moving along the spiral-shaped flange and the axial portion in a direction toward the tip portion.

2. The locking mechanism according to claim 1, wherein the spiral-shaped flange continuously extends along the longitudinal axis of the axial portion and around the axial portion such that every plane perpendicular to the longitudinal axis of the axial portion that intersects the spiral-shaped flange, except for the terminal end of the spiral-shaped flange, intersects the spiral-shaped flange along less than a 30 degree extension along the outer surface of the axial portion, and such that a plane perpendicular to the longitudinal axis of the axial portion that intersects the terminal end of the spiral-shaped flange intersects the spiral-shaped flange along more than a 30 degree extension along the outer surface of the axial portion.

3. The locking mechanism according to claim 1, wherein the engagement portion includes an opening through which the engagement portion may be engaged to rotate the locking mechanism.

4. The locking mechanism according to claim 3, wherein the opening is circular or oval shaped.

5. A method of locking a first cover half to a second cover half of a cover used to cover a high-voltage electrical connector connecting an electrical transmission conductor to a distribution conductor, the first cover half having a first aperture and a first protrusion, and the second cover half having a second aperture and a second protrusion, the method comprising:
    providing a locking mechanism, the locking mechanism including:
        an axial portion having outer surface and a tip portion at a first end of the axial portion, the axial portion having a uniform outer diameter configured to pass through the first and second apertures, the tip portion having a first end and a second end spaced from the first end of the tip portion;
        a spiral-shaped flange attached to the outer surface of the axial portion and having a larger cross-sectional area than the axial portion, the spiral-shaped flange having a first flange end and a second flange end spaced from the first flange end, wherein the first flange end begins at the second end of the tip portion, wherein at least a portion of the second flange end extends from the axial portion in a direction perpendicular to a longitudinal axis of the axial portion forming a terminal end, and wherein the spiral-shaped flange makes at least two complete turns around the outer surface of the axial portion;
        an end support member having a first side and a second side, wherein the first side of the end support member is attached to the second end of the axial portion, and wherein at least the first side of the end support member has a cross-sectional area that is at least the same as the cross-sectional area of the spiral-shaped flange;
        an engagement portion attached to the second side of the end support member; and
        a holding portion extending along the axial portion between the terminal end of the spiral-shaped flange and the first side of the end support member;
    inserting the tip portion into the first aperture in the first cover half until the first flange end engages the first aperture in the first cover half;
    rotating the engagement portion such that the first flange end enters the first aperture in the first cover half so that the spiral-shaped flange guides movement of the first cover half along the spiral-shaped flange and the axial portion toward the holding portion;

inserting the tip portion into the second aperture in the second cover half until the first flange end engages the second aperture in the second cover half; and rotating the engagement portion such that the first flange end enters the second aperture in the second cover half so that the spiral-shaped flange guides movement of the second cover half along the spiral-shaped flange and the axial portion toward the holding portion;

wherein when the first aperture of the first cover half and the second aperture of the second cover half are within the holding portion, the first protrusion of the first cover half contacts the first side of the end support member and the second protrusion of the second cover half contacts the portion of the terminal end of the spiral-shaped flange such that the first and second protrusions deform holding the cover halves from moving along the spiral-shaped flange and the axial portion in a direction toward the tip portion.

6. A cover system for a high-voltage electrical connector comprising:
a cover used to cover an electrical connector, the cover including a first cover half and a second cover half, the first cover half having a first aperture and a first protrusion, and the second cover half having a second aperture and a second protrusion; and
a locking mechanism including:
an axial portion having outer surface and a tip portion at a first end of the axial portion, the axial portion having a uniform outer diameter configured to pass through the first and second apertures, the tip portion having a first end and a second end spaced from the first end;
a spiral-shaped flange attached to the outer surface of the axial portion and having a larger cross-sectional area than the axial portion, the spiral shaped flange having a first flange end and a second flange end spaced from the first flange end, wherein the first flange end begins at the second end of the tip portion, wherein at least a portion of the second flange end extends from the axial portion in a direction perpendicular to a longitudinal axis of the axial portion forming a terminal end, and wherein the spiral-shaped flange makes at least two complete turns around the outer surface of the axial portion;
an end support member having a first side and a second side, wherein the first side of the end support member is attached to the second end of the axial portion, and wherein at least the first side of the end support has a cross-sectional area that is at least the same as the cross-sectional area of the spiral-shaped flange;
an engagement portion attached to the second side of the end support member; and
a holding portion extending along the axial portion between the terminal end of the spiral-shaped flange and the first side of the end support member;
wherein when the first flange end is inserted into the first aperture in the first cover half and the engagement portion is rotated, the spiral-shaped flange guides movement of the first cover half along the spiral-shaped flange and the axial portion toward the holding portion;
wherein when the first flange end is inserted into the second aperture in the second cover half and the engagement portion is rotated, the spiral-shaped flange guides movement of the second cover half along the spiral-shaped flange and the axial portion toward the holding portion; and
wherein when the first aperture of the first cover half and the second aperture of the second cover half are within the holding portion, the first protrusion of the first cover half contacts the first side of the end support member and the second protrusion of the second cover half contacts the terminal end of the spiral-shaped flange such that the first and second protrusions deform holding the cover halves from moving along the spiral-shaped flange and the axial portion in a direction toward the tip portion.

\* \* \* \* \*